United States Patent [19]  [11] 3,896,002
Howard et al.  [45] July 22, 1975

[54] PRODUCTION OF BREFELDIN-A

[75] Inventors: Colin C. Howard, Downham Market; Robert A. W. Johnstone, Bebington; Ian D. Entwistle, Sittingbourne, all of England

[73] Assignee: Shell Oil Company, Houston, Tex.

[22] Filed: May 14, 1973

[21] Appl. No.: 359,937

[30] Foreign Application Priority Data
May 22, 1972  United Kingdom............... 23949/72

[52] U.S. Cl................................. 195/81; 195/36 R
[51] Int. Cl............................................. C12d 9/00
[58] Field of Search............. 195/81, 36 R, 31, 80 R

[56] References Cited
OTHER PUBLICATIONS
Suzuki et al., Agr. Biol. Chem., 1970, 34(3) pp. 345–413.

Primary Examiner—A. Louis Monacell
Assistant Examiner—Thomas F. Wiseman

[57] ABSTRACT

Brefeldin-A is prepared by cultivating a fungus of the genus Phyllosticta in an aqueous medium and recovering Brefeldin-A from the cultivated mixture.

4 Claims, No Drawings

PRODUCTION OF BREFELDIN-A

BACKGROUND OF THE INVENTION

Brefeldin-A is the name given to a fungal metabolite which has been shown to exhibit potentially useful phytotoxic and fungitoxic properties. It is also known as ascotoxin, decumbin and cyanein, and has been assigned the formula:

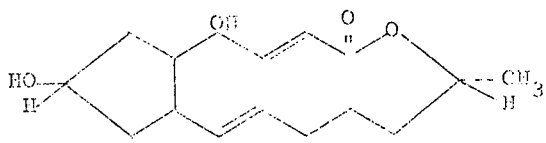

E. Haerri et al., Helv. Chim. Acta, 46, 1235–43 (1963) (59 C.A. 5726H (1963)); H. P. Sigg, ibid., 47, 1401–15 (1964) (61 C.A. 14543c (1964)); V. Betina et al., Acta Chem. Scand., 19, 519 (1965) (63 C.A. 4169a (1965)).

The compound has been isolated from a numer of fungi, including *Penicillium brefeldianum*, *Penicillium decumbens*, *Penicillium cyaneum*, *Ascochyta imperfeta*, *Nectria radiciola* and *Curvularia lunata*, but these fungi produce the compound in only relatively small amounts, so that the development of its useful properties has been hampered.

SUMMARY OF THE INVENTION

It has now surprisingly been found that Brefeldin-A is produced in much larger amounts during the cultivation of certain members of a known group of fungi.

Accordingly the present invention provides a process for the production of Brefeldin-A which comprises cultivating a fungus of the genus Phyllosticta in the presence of an aqueous medium containing a source of assimilable carbon, and recovering the Brefeldin-A from the cultivated mixture.

PREFERRED EMBODIMENTS OF THE INVENTION

The fungus used is preferably *Phyllosticta medicaginis* (CBS 479.63).

The source of assimilable carbon may be any suitable carbohydrate-containing material, for example, starches or sugars, and is suitably present in the aqueous medium in a concentration of up to 10% w/v and preferably up to 5% w/v. A preferred source of carbon is glucose and a suitable medium containing glucose is given in Example II.

In the preferred conduct of the process of the invention, the fungus is grown batchwise. The aqueous medium containing the source of assimilable carbon is inoculated with the fungus, which is then allowed to grow in contact with oxygen (air) for period of up to 20 days at a temperature of 20°–30°C, preferably 25°C. The aqueous phase then is separated, as by filtration or centrifugation, and the crude product is recovered by extraction from the aqueous phase with a suitable selective solvent, preferably ethyl acetate. The crude product may be further purified, for example, by recrystallization from a suitable solvent.

EXAMPLE I

Small-scale Preparation

Static "penicillium" culture pans each holding 500 milliliters of an aqueous medium containing a potato extract (0.5%w) and dextrose (1.5%w) were inoculated with a suspension containing spores of *Phyllosticta medicaginis*. Each pan was then incubated for 20 days at 25°C. At the end of this period, the fungal pelt was filtered off and the filtrate was extracted three times with half its volume of ethyl acetate. The solvent was removed under reduced pressure to yield the crude product as a pale yellow solid (yield approx. 2.0 grams per 10 liters of medium), which was further purified by recrystallation from aqueous methanol. The compound was shown by its spectral and other properties to be identical with that of Brefeldin-A obtained from the culture of other fungi.

EXAMPLE II

Large-scale Preparation

The aqueous medium used in this preparation had the following composition:

Glucose 5%; $KH_2PO_4$ 0.5%; Mycological peptone 0.5%, Yeast extract 0.5%; $MgSO_4$ 0.02% (w/v).

A spore suspension of *P. medicaginis* was inoculated into a flask containing 1 liter of the medium, and the flask was incubated for 3 days at 25°C. At the end of this period the culture so obtained was used to inoculate 100 liters of the medium containing 0.01% w/v polypropylene P2000 as anti-foaming agent, contained in a 120 liter capacity fermenter. The medium was stirred at 700 rpm and an air flow of 50 liters per minute was maintained. The fermentation was allowed to proceed for 5 days at 25°C. The culture was then extracted with ethyl acetate to yield the required Brefeldin-A (yield approx. 3.0 grams per 10 liters of medium).

What is claimed is:

1. A process for the production of Brefeldin-A which comprises cultivating a fungus of the species *Phyllosticta medicaginis* in the presence of an aqueous medium containing a source of assimilable carbon, and recovering Brefeldin-A from the cultivated mixture.

2. A process according to claim 1 in which the fungus is *Phyllosticta medicaginis* (CBS 479.63).

3. A process according to claim 2 in which the source of assimilable carbon is a carbohydrate-containing material.

4. A process according to claim 3 in which the source of carbon is glucose.

* * * * *